United States Patent
Higgs et al.

[15] 3,661,674
[45] May 9, 1972

[54] METHOD FOR THE MANUFACTURE OF FLEXIBLE SHEET MATERIALS

[72] Inventors: Maurice William Higgs, Pelsall; Dennis Ivor Clarke, Erdington, both of England

[73] Assignee: Dunlop Holdings Limited, London, England

[22] Filed: Oct. 9, 1970

[21] Appl. No.: 79,679

Related U.S. Application Data

[63] Continuation of Ser. No. 625,002, Mar. 22, 1967, abandoned.

[30] Foreign Application Priority Data

Apr. 6, 1966 Great Britain......................15,413/66

[52] U.S. Cl............................156/280, 117/104, 117/121.2, 117/135.5, 117/140, 156/148, 156/254, 161/151, 161/154, 161/155, 161/156, 161/159

[51] Int. Cl. ...................................B32b 31/12, B32b 31/26

[58] Field of Search ......................117/98, 104, 121.2, 135.5, 117/140; 156/148, 254, 278, 280; 161/151, 154, 155, 156, 159, 170

[56] References Cited

UNITED STATES PATENTS 3,193,437   7/1965   Schafer....................................161/89

*Primary Examiner*—William A. Powell
*Attorney*—Stevens, Davis, Miller & Mosher

[57] ABSTRACT

To form a flexible leather-like sheet material a compressed sheet of cellular material is adhered to one or each surface of the resulting assembly, the binder is allowed to permeate and impregnate the assembly and the impregnated assembly is heated to set the binder. The term "fibrous material" is breadly defined in order to include also cellular non-fibrous materials.

13 Claims, No Drawings

METHOD FOR THE MANUFACTURE OF FLEXIBLE SHEET MATERIALS

This application is a continuation of application Ser. No. 625,002, filed Mar. 22, 1967, now abandoned.

This invention relates to a method for the manufacture of flexible sheet materials, particularly leather-like sheet materials having at least one surface comprising a cellular material.

According to the present invention a method for the manufacture of flexible sheet material comprises adhering a compressed sheet of a cellular material to one surface of a fibrous or cellular material, applying a binder to one surface of the assembly and allowing the binder composition to permeate and impregnate the assembly, and heating the impregnated assembly to set the binder.

According to the present invention also there is provided a flexible sheet material when prepared by the method according to the immediately preceding paragraph.

The fibrous material may suitably be a textile fabric or a layer of non-woven staple or continuous fibers which can if desired be bonded together with a resinous or elastomeric bonding agent, or any combination thereof.

By the term "compressed sheet" of a cellular material as used throughout this specification there is meant a sheet of the material which has been compressed under conditions, usually heat and pressure, such that the material is retained in the compressed form when the compressive forces are released. The sheet may be compressed in the absence of adhesive. But if desired the sheet may be compressed in the presence of adhesive which can be set, usually by drying and/or curing, while the sheet is held in a compressed condition. Examples of suitable cellular materials which can be compressed under heat and pressure and which retain the compressed form during subsequent fabricating conditions are polyurethane foams, natural and synthetic rubber foams, poly(vinyl chloride) foams, polyethylene foams, polypropylene foams, and plastic foams in general. A particularly suitable material is a polyurethane foam.

The thickness of the compressed sheet is not critical but is usually from 0.005 to 0.080 inch, preferably from 0.010 to 0.020 inch. The degree of compression applied to the foam will usually be just sufficient to produce a layer of thickness within the above range and which is permeable to water vapor but preferably impermeable to liquid water. However, completely impermeable materials, or if desired liquid-permeable materials can be produced. An example of a typical compression would be a reduction in thickness from 0.4 inch to about 0.02 inch i.e. about 20:1. The pore size of the cellular material prior to compression is preferably from 100 to 800 microns diameter, and especially suitable materials are those having a pore size of 100 to 200 microns diameter.

The actual size of the pores in the surface is not greatly affected by the compression treatment and so the pores in the surface of the compressed sheet will be of substantially the same size as in the non-compressed material. However, a proportion of the pores in the interior of the cellular material, especially the larger pores, will be caused to adopt an elongated configuration and become elliptical.

It is preferred that the compressed cellular material has a density of from 0.02 to 0.85 g/cc, especially from 0.4 to 0.7 g/cc, but these figures are intended merely as a guide rather than a limitation. A typical compression of about 20:1 would result in an increase in the density of the material from 0.03 g/cc to about 0.6 g/cc.

The number of pores in a given area of the surface of the compressed sheet will be substantially the same as the number of pores in the surface of the sheet prior to compression. But on compression of the cellular material the number of pores in a given area of a section through the compressed material (i.e. in the direction of compression) will be increased with respect to the corresponding number in the sheet prior to compression. Thus in the compressed sheet the number of pores in a given area of the surface will be less than the number of pores in the same area of a section through the compressed material.

The compressed cellular material is one which permits impregnation with a suitable binder. Suitable compressed cellular materials are made by compressing foams having an at least partially open-pored structure. The desired open-pored structure can be achieved by partial or complete reticulation of the materials or by mechanical rupture of the cell membranes in the materials, e.g. by mangling. Reticulation can be achieved, for example, by packing the cellular material into an explosion chamber containing an explosive gaseous medium and exploding the gas, or by ozone-treatment, or, if the cellular material is a polyester polyurethane foam, by the action of aqueous sodium hydroxide. Alternatively, the cellular material may be inherently reticular as made. An inherently reticular polyester polyurethane foam may be made, for example, by allowing the foam-forming ingredients to react in the presence of a viscosity-retarding substance such as a further polyester having an acid component which is the same as that of the polyester used to make the foam but which has a hydroxyl number of between 10 and 100 and a viscosity of less than 200 poises.

Reticular and, especially, reticulated cellular materials are particularly advantageous in the present invention. Some advantages of a flexible sheet material according to this invention in which the cellular material is a reticular or reticulated foam over a similar sheet material in which the cellular material is a non-reticular or non-reticulated foam are that it has a greater permeability at the same degree of compression; it can be impregnated with a binder at a greater degree of compression; it may be impregnated with a binder more easily; and when it is scuffed it has the appearance of scuffed natural leather whereas the sheet material containing the non-reticular or non-reticulated foam tends to rip.

If desired, the cellular material may have fibers distributed within it. Such a material may be made by allowing the foam-forming mixture to react in the presence of the fibers. Suitable fibers are those of thermoplastic materials such as polyesters and polyamides and those of non-thermoplastic materials such as cotton, wool and rayon. The fibers may have a length of, for example, between 0.03 and 10 mm and a denier of, for example, between 0.1 and 30, and may suitably be present in an amount of between 1 and 30 parts by weight per 100 parts by weight of the cellular material.

As hereinbefore stated the compressed sheet may contain an adhesive which is introduced into the sheet prior to compression thereof and which is set, usually by drying and/or curing, to maintain the sheet in a compressed condition. The adhesive is preferably substantially insoluble, in water so that it does not wash out of the compressed sheet during any subsequent fabricating procedures involving aqueous based substances. Examples of suitable adhesives are latices of natural or synthetic rubbers, hardenable resins such as polyester resins and epoxy resins (which are usually hardened by means of an amine), poly(vinyl chloride) and polyurethanes. The particular adhesive used will depend to some extent upon whether it is desired to produce a permeable or an impermeable product, and if a permeable product then the degree of permeability required.

The amount of the adhesive will depend upon the degree of permeability that is desired in the product. If an impermeable product is to be produced, then the sheet will usually be saturated with the adhesive prior to compression, although it is to be understood that a small amount of adhesive may be used and the resulting material made impermeable by subsequent impregnation with a binder. If a permeable product is desired, then the sheet must not be totally saturated prior to compression, and in this case it is preferred to apply the minimum amount of the adhesive.

The adhesive is usually applied in a liquid medium such as water or a solvent for the adhesive. A particularly suitable adhesive composition is a latex dispersion of the adhesive in water. Other suitable compositions are an emulsion in water of a solution of the adhesive in a suitable solvent, or a solventless adhesive composition. The liquid adhesive composition can be applied by any suitable technique, and the amount of the adhesive can be controlled to some extent by mangling the impregnated material to remove excess adhesive.

A layer of compressed cellular material is adhered to one or each surface of a fibrous or cellular material. The adherence may be attained by means of a suitable adhesive, for example a natural rubber latex (especially a deproteinized natural rubber latex), a polychloroprene latex, an ethylene/vinyl acetate copolymer adhesive, a latex of a graft copolymer of natural rubber and poly(methyl methacrylate), a solvent-based neoprene adhesive, a polyurethane adhesive or a carboxylated styrene/butadiene copolymer latex. Alternatively, the surface of the compressed sheet can be rendered adhesive to the fibrous or cellular material by treatment with a suitable solvent or by melting the surface. Alternatively, the compressed sheet may be adhered to a fibrous material by means of a needle-punching machine having barbed needles preferably operated from the fibrous material side of the assembly.

In the case where an adhesive is used between the compressed sheet and the fibrous or cellular material this is preferably applied sparingly to the surface of the compressed sheet and/or to the surface of the fibrous or cellular material (usually only to one of the surfaces to be adhered together) and the two layers are pressed together. Pressing may be carried out between press platens or as a continuous operation using nip rollers. The adhesive may be applied by a technique which controls the amount and distribution of the adhesive, for example a printing technique. Requisite portions of the compressed sheet can be melted or treated with solvent if an adhesive is not used.

The sheet of a cellular material need not be compressed prior to application thereof to the fibrous or cellular material since compression can be effected during pressing together of the two layers between heated platens or heated nip rollers. It is to be understood that when the compressed sheet is adhered to cellular material such material need not be entirely non-compressed and can if desired be another compressed sheet and can be open-pored or closed-pored and may or may not contain fibers distributed within it as described above.

When a non-woven fabric is used as the fibrous material it is usually adhered to the compressed sheet of a cellular material by means of an adhesive between the layers. Again the amount and distribution of the adhesive must be controlled and a printing technique is preferably employed. The use of an open-mesh fabric coated with adhesive as an intermediate layer would be equivalent to applying the adhesive sparingly. The layer of fibrous material to which the compressed sheet is adhered may be a non-woven layer of fibers which may be applied in the form of a layer in which the fibers have previously been bonded together with a suitable bonding agent. Preferably the fibers are in a crimped condition. Such a non-woven, fibrous layer and a method for its manufacture are described and claimed in our U.K. Pat. Specification No. 989,433, in which various methods of making the bonded layer and the bonding agents which may be used are described.

Alternatively, non-bonded crimped continuous-fiber felts may be used as the non-woven fibrous material, or, if desired, felts comprising a mixture of staple fibers and continuous fibers may be used. The felt is preferably needle-punched to effect some degree of consolidation thereof prior to application of the compressed sheet.

An alternative fibrous material which may be present is a knitted or woven fabric, or an Arachne fabric. The fabric can be made of any natural or synthetic fibers, but usually fabrics made of rayon, cotton, poly(ethylene terephthalate), acrylic fibers or a polyamide are used. The fabric, usually a woven fabric is preferably a plain-woven fabric of relatively fine yarns, e.g. yarns having a denier of from 40 to 150. The fabric can suitably have a superficial density of from 40 to 150 g per square meter.

After the compressed sheet has been adhered to the fibrous or cellular material, the assembly is impregnated with a binder. Impregnation is effected by applying the binder which will usually be in the form of a solution or dispersion of the binder, to one surface of the assembly and allowing the binder to permeate the assembly. Preferably, the binder is applied to the lower surface and is allowed to permeate upwards through the assembly, and in this case the compressed sheet layer is preferably uppermost. Excess binder may then be removed from the surfaces of the impregnated assembly, for example by scraping, and the impregnated assembly can then be heated to set the binder. Where permeability is desired, it is preferred to gel the binder in place and subsequently heat to dry or cure the binder. Suitable gelation systems are sodium silicofluoride, heat-gelling systems of ammonium chloride and zinc oxide and polyoxypropylene glycol-salt systems, Temperatures of about 100° C. will usually be employed to cure the binder.

The binder is usually a polymeric composition, normally in solution or aqueous dispersion, which permeates into the assembly of compressed cellular material and fibrous material and at least partially fills the air-spaces therein. The composition of the binder can be such that it adheres to the material by physical or chemical bonds, or merely fills the spaces without adhesion.

Examples of suitable binders are latices of natural or synthetic elastomers, flexible thermoplastic materials such as poly(vinyl chloride), polyurethane compositions and copolymers of ethylene and vinyl acetate. Typical synthetic elastomers which may be used are copolymers of butadiene with styrene and copolymers of butadiene with acrylonitrile. The preferred binder is a microporous material formed from a latex compounded with silicone oil.

Differential distribution of the binder can be secured by heating one surface of the impregnated assembly differentially with respect to the other surface. The binder is supported in a vaporizable vehicle which is removed by heat. When this technique is used it is usually the surface of the compressed sheet which is heated.

The flexible sheet materials may be provided with a finishing coating layer of a polymeric composition such as a layer of a polyacrylate composition or a polyurethane composition. If provided, this layer is preferably attached to the exposed surface of the compressed sheet. The polyurethane composition can be applied by any suitable technique such as spraying or brushing, but a particularly suitable technique is a film-transfer technique in which a polyurethane film is formed on the surface of a material from which the polyurethane film can be stripped after curing. The flexible sheet material is then superimposed on the surface of the polyurethane film when the film has cured sufficiently to be tacky but before it is fully cured. The curing of the polyurethane is then completed and the coated flexible sheet material is removed from the release surface by stripping. Such a film-transfer technique is described and claimed in our U.K. Pat. Specification No. 1.037,632. The polyurethane film can be formed directly from a polymeric polyol by a "one-shot" technique, but is preferably formed by a "prepolymer" technique in which a prepolymer (formed by reacting a polymeric diol with an excess of a diisocyanate) and a cross-linking agent and/or chain-extending agent are reacted to form the film.

The material upon which the polyurethane film is formed can be any plastic material, paper, glass or polished metal from which the cured film can be removed by stripping, and examples of suitable plastic materials are polyethylene, polypropylene, poly(ethylene terephthalate) and poly(tetrafluoroethylene). The material may be used in the form of a thin film as a liner. If desired, the material may have an embossed surface, so that a desirable embossed surface is obtained on the coated flexible sheet material.

The flexible sheet materials of the present invention can be permeable to water vapor but are preferably impermeable to liquid water, and can have a surface consisting of a porous fibrous structure similar to the surface of natural leather. The materials can be finished with conventional leather finishing agents, and they may, if desired, be embossed to enhance the surface characteristics. Embossing can be effected during or subsequent to surface finishing processes. Even after embossing, the materials can retain a high rate of transmission of water vapor e.g. a rate of from 1 to 6 milligrams per square cm. per hour. The material can be used as a substitute for natural leather for many purposes and is particularly suitable for use in the manufacture of shoe-uppers, shoe-linings, upholstery, clothing and handbags.

The invention is illustrated by the following examples in which all "parts" are parts by weight.

EXAMPLE I

A sheet of reticulated polyester polyurethane foam of thickness 1 cm. and having an average pore size of from 160 to 300 microns diameter and a weight of 26.5 g/sq. ft. was compressed to a thickness of 0.018 inch at 180° C. for 5 minutes in a platen press. The foam retained its compressed structure on removal from the press.

Another sheet of the same foam, again of thickness 1 cm., was compressed under the same conditions but to a thickness of 0.045 inch.

A cotton scrim fabric (40 mesh) weighing 5.4 g/sq. ft. was fully saturated by pulling it through a bath containing a latex of a graft copolymer of poly(methyl methacrylate) and natural rubber, the latex having a total solids content (dry) of 30 percent. The fabric was then passed between two scraper bars to remove excess latex so that the amount of dry rubber in the fabric was 4 g/sq. ft.

The compressed foam of thickness 0.018 inch was laid on a flat smooth surface and on it was superimposed the impregnated fabric. The foam of thickness 0.045 inch was then superimposed on the fabric and the resulting assembly was maintained under light pressure whilst the latex was dried by heating the assembly in an air-oven at 120° C.

A latex was prepared as follows. 0.6 parts of a latex thickening agent available under the trade name Viscalex E.M. 15 as a 15 percent aqueous dispersion of polyacrylic acid was diluted with 40 parts of water. Ammonia (aqueous) was added to the resulting latex until the latex had a pH of 11.0. This latex was mixed into 100 parts of a natural rubber latex (dry solids content 60 percent) which was then allowed to cream for 2 days.

After this time, a clear serum had formed at the bottom of the latex and this serum was stirred back into the latex. The following ingredients were then mixed into 100 parts of the latex:

| Ingredients | Parts |
|---|---|
| 1. Aqueous solution of potassium oleate | 5.0 |
| 2. Aqueous dispersion of di-betanaphthyl-para phenylene diamine | 1.0 |
| 3. Aqueous dispersion of zinc mercapto benzthioazole | 2.0 |
| 4. Aqueous dispersion of zinc dibutyl dithio-carbamate | 1.0 |
| 5. Aqueous dispersion of sulphur | 2.5 |
| 6. Aqueous dispersion of zinc oxide | 2.5 |
| 7. 50% emulsion of silicone oil | 3.0 |
| 8. 10% solution of sodium isopropyl xanthate | 0.4 |
| 9. Aqueous solution of ammonium chloride | 3.0 |

Ingredient 1 was a solution of 15 g of potassium oleate per 100 g of the solution, ingredient 2 contained 40 g of the solid per 100 g of the dispersion, ingredients 3 to 6 contained 50 g of the solid per 100 g of the solution.

A portion of the resulting latex was pored into a flat tray and the foam-fabric-foam assembly was placed in the latex with the compressed foam (thickness 0.018 inch) uppermost. The latex was seen to permeate through the assembly to the top surface and when this had been achieved the saturated composite structure was removed from the tray. Excess latex was removed by scraping from the bottom surface of the assembly, and the composite structure was placed on a flat smooth surface in a steam-oven to effect gellation of the impregnating latex. The latex was cured in steam at a temperature of 100° C. for 20 minutes, after which time the wet product was dried in hot air.

When the product was dry the underside of the composite structure (i.e. the surface of the foam of thickness 0.045 inch) was lightly buffed to removed residual rubber from the surface.

A pigmented composition was prepared from the following ingredients,

| | Parts |
|---|---|
| Polyacrylate latex (Primal AC55) | 2 |
| Aqueous pigment dispersion (Primal Black) | 2 |
| Water | 1 | and a spray-coat of this composition was applied to the upper surface of the composite structure (i.e. the surface of the compressed foam of thickness 0.018 inch). The coated material was then heated between smooth press platens for 30 seconds at a temperature of 120° C. and under a pressure of 40 lb/sq. in.

The composite material was 1.8 mm in thickness and had a matt surface. The material had a leather-like appearance and handling properties, and its water-vapor transmission rate was 1.5 mg/sq.cm./hr.

EXAMPLE II

A sheet of reticulated polyester polyurethane foam of thickness 1 cm. was compressed for 5 minutes at 180° C. between press platens to a thickness of 0.015 inch.

A synthetic fiber felt was then made as follows. A web sheet of continuous nylon filaments of denier 840 was passed over a heated plate and then over a cooled knife-edge at an appropriate inclined angle of 28° to crimp the filaments. A number of the crimped sheets, still held under tension, were laid one upon the other, and the assembled sheets were allowed to relax (i.e. released from tension) so that the filaments were allowed to crimp. During relaxation the filaments were heated at about 100° C.. A staple-fiber non-woven fabric was prepared consisting of polypropylene staple fibers of 3 denier.

The nylon web was laid on the staple fiber web and the assembly was passed four times through a needle-punching machine adjusted to give 800 needle punches per square inch, so that the assembly received a total of 3,200 needle punches per square inch. The depth of penetration of the barbed needles was one-sixteenth inch. The needled assembly was then impregnated with a natural rubber latex compounded to the following formula:

| | Parts |
|---|---|
| Natural rubber latex (60% total solids) | 167 |
| Sulphur (50% aqueous dispersion) | 2 |
| Zinc dibutyl dithiocarbamate (50% aqueous dispersion) | 1 |
| Zinc oxide (50% aqueous dispersion) | 6 |
| Agerite White (50% aqueous dispersion) | 2 |
| 15% aqueous potassium oleate | 6.7 |
| Ammoniacal ammonium chloride (pH:10) | 3 |
| Primal Dark Brown Pigment | 15 |
| Water | 4 |

Sufficient water was added to the latex to result in a latex containing 25% total solids.

The web was impregnated so as to contain 25 percent dry weight based on the weight of the impregnated web. The impregnated web was washed and then dried in an air-oven at 80° C. for 1½ hours. The dried web, which weighed 32 g/sq. ft. was compressed to a thickness of 1.2 mm in a press.

One square foot of a woven fabric having the following specification:

Material: Bright continuous viscose rayon.
Yarn denier (warp and weft): 100 (40 filaments)
Ends per cm. (warp and weft): 33
Turns per meter (warp and weft): 700 S
Weight (grams per sq. meter): 75 was saturated with a latex made to the folowing formulation and which had been matured for 24 hours at 20° C. before use.

| | Parts |
|---|---|
| Pliolite 2108 (40% total solids) | 500 |
| Resorcinol | 11 |
| Aqueous Formaldehyde Solution (37% w/v) | 16.2 |
| Aqueous Sodium hydroxide (10% total solids) | 14 |
| Water | 186.8 |

Pliolite 2108 is a butadiene/styrene copolymer containing approximately 25 percent of styrene units.

Saturation was effected by the technique described in Example I, to give 5 g/sq. ft. of the dry solids in the fabric. The fabric was laid while still wet on the compressed foam layer and the polypropylene surface of the impregnated web was laid on the exposed surface of the fabric. The composite product was dried for 2 minutes at 140° C. while held at a pressure of 5 lb/sq. in. against a rotating drum with a rubber belt.

The assembly was then impregnated with the latex mix and by the method described in Example I.

A solution of a polyurethane prepolymer derived from tetramethylene ether glycol and tolylene diisocyanate, available under the trade name Adiprene L 167, was prepared to the following formulation:

| | Parts |
|---|---|
| Adiprene L167 | 1000 |
| Ceres Black Dye (BN:G=2:1) | 30 |
| Toluene | 1970 |

A solution of methylene bis aniline was prepared to the following formulation:

| | Parts |
|---|---|
| Methylene bis aniline | 400 |
| Cellulose aceto butyrate | 15 |
| Methyl ethyl ketone | 1585 |

A 0.001 inch thick continuous dry film of the polyurethane rubber was made by spraying the ingredients from a two-stream spray-gun onto a 0.005 inch thick polypropylene sheet the surface of which had previously been embossed to provide it with a matt texture.

The stoichiometry of the system was so adjusted that 100 g/min. of the Adiprene solution was fed from one stream of the spray-gun and 20 g/min. of the amine solution was fed from the other stream of the spray-gun. The solvent was evaporated for 3 minutes at ambient temperature, or until the film was in a suitably tacky condition. The compressed foam side of the previously made composite product was applied under pressure to the partially cured film and the polyurethane film then completely cured still in contact with the polypropylene embossed sheet at 100° C. for 1 hour.

The polypropylene sheet was then stripped off and the leather-like product had a matt surface which was an exact copy of the textured polypropylene surface on which it had been produced. The product had a water vapor permeability of 1.0 mg/sq. cm./hr. and had very good scuff resistance.

EXAMPLE III

A non-woven web was prepared from 6 denier crimped continuous filament Nylon 66 by forming the extended crimped filaments into two sheets of warps and combining and relaxing the warp sheets continuously by means of a machine so that the crimped filaments intermingle in three dimensions. The relaxed web weighed 18 g/sq.ft. It was laminated to a layer of carded 3 denier polypropylene staple fiber weighing 6 g/sq.ft. by passage through a needle-punching machine and received 400 punches per sq.inch at a penetration of one-eighth inch.

The web was doubled, nylon side to nylon side, to form a sandwich of polypropylene/nylon/polypropylene. The composite web was passed through a needle-punching machine and received 2,000 punches per sq.inch. The needling was carried out at a penetration of three-eighths inch using 41 gauge needles.

The surfaces of the composite web were sprayed with a total of 6 g/sq.ft. of water and compressed to 2.5 mm in a spaced mold at 150° C. for 30 seconds. The compressed web was split into two sheets of 1.25 mm thickness by a leather-splitting machine fitted with a band knife.

A sheet of reticulated polyether polyurethane foam of thickness 1 cm. having pores of 160 to 300 microns diameter and weighing 16 g/sq.ft., was compressed to a thickness of 0.016 inch by passage at a speed of 1 ft. per minute through externally heated nip rollers at 230° C.

One sq. ft. of a woven fabric having the following specification:

Material: Bright continuous viscose rayon.
Yarn denier (warp and weft) 100 (40 filaments)
Ends per cm. (warp and weft) 33
Turns per meter(warp and weft) 700S
Weight (grams/sq.meter) 75 was saturated with a latex made to the following formulation and which had been matured for 24 hours at 20° C. before use.

| | Parts |
|---|---|
| Pliolite 2108 (40% total solids) | 500 |
| Resorcinol | 11 |
| Aqueous formaldehyde (37 w/v) | 16.2 |
| Water | 186.8 |

Pliolite 2108 is a butadiene/styrene copolymer containing approximately 25 percent styrene units.

Saturation of the fabric was effected by pulling it between a bath of the latex and then through two scraper bars to remove the excess latex so that the amount of the dry solids in the fabric was 5 g/sq. ft. The fabric was laid while still wet on the compressed foam layer and the polypropylene surface of the base web was brought into contact with the side of the fabric remote from the foam. The composite product was dried for 2 minutes at 140° C. held at a pressure of 5 lb/sq. in. against a rotating drum by a poly(ethylene terephthalate) mesh belt. The dry product had a weight of 56 g/sq.ft.

A heat-sensitive vinyl latex composition, as detailed below, was prepared. The latices were blended together and the polyoxypropylene diol followed by the water and pigment dispersion were stirred in. The sodium chloride solution was then added slowly with efficient stirring.

| | Parts |
|---|---|
| Butadiene/acrylonitrile latex (total solids 38%) (Breon 1512E1) | 25 |
| Vinyl latex (total solids 50%) (Breon 652) | 75 |
| Aqueous polyoxypropylene diol, cloud point 35–40° C. (25% w/w) | 8 |
| Water | 50 |
| Aqueous dark brown pigment dispersion (32% w/w) | 7.5 |
| Aqueous sodium chloride (10% w/w) | 75 |

A portion of the latex composition was poured into a flat tray and the composite foam-fabric-web assembly was placed on the latex with the compressed foam surface uppermost. The latex was seen to permeate through the foam to the top surface and when this had been achieved the saturated composite structure was removed from the tray. Excess latex was removed by scraping the bottom of the web and the composite structure was placed in a steam-oven for 3 minutes to effect gellation of the impregnating latex. The wet product was leached with water and dried in hot air. The weight of dry product was 101 g/sq.ft.

When the product was dry the web surface of the composite structure and the foam surface were lightly buffed to remove residual polymer.

A pigmented composition was prepared from the following ingredients:

| | Parts |
|---|---|
| Polyacrylate latex (Primal AC55) | 2 |
| 13% Aqueous pigment dispersion (Primal Black) | 2 |
| Water | 1 |

Three spray-coats of this composition were applied to the upper surface of the composite structure, i.e. the surface of the compressed foam. The coated material was then plated between smooth press platens for 2 minutes at a temperature of 140°C under light pressure.

The composite material was 1.6 mm in thickness. The material had a leather-like appearance and handling properties and its water-vapor transmission rate was 1.0 mg/sq.cm./hr.

EXAMPLE IV

A sheet of reticulated polyether polyurethane foam of thickness 1 cm. having an average pore count of 50 pores/inch and weighing 16 g/sq.ft. was compressed to 0.016 inch by passage through nip rollers at 230° C.

A non-woven web was prepared as in Example III except that the composite sandwich structure when needled received a total of 800 punches per sq. inch from each side to give a total punch density of 1,600 punches per sq inch. The needling was carried out at a penetration of three-eighths inch from 41 gauge needles.

A latex composition was prepared from the following ingredients:

| | Parts |
|---|---|
| Natural rubber latex (total solids 60%) | 167 |
| Aqueous dispersion sulphur (total solids 50%) | 2 |
| Aqueous dispersion zinc dibutyl dithiocarbamate (total solids 50%) | 1 |
| Aqueous dispersion Agerite White (total solids 50%) | 2 |
| Aqueous dispersion Primal Dark Brown Pigment (total solids 32%) | 15 |
| Aqueous dispersion zinc oxide (total solids 50%) | 6 |
| 20% Ammoniacal ammonium chloride solution (pH=10) | 6.7 |
| Water | 77.3 |

The web was impregnated with the above latex by distributing the latex over the surface of the web and passing between nip rollers to squeeze out excess latex. The latex was gelled in the web by passage through a live steam-oven. The material was dried at 70° C. The total pick-up of dry rubber was 6 g/sq.ft.

The web was then compressed and split into two sheets 1.25 mm thick as described in Example III. This web was laminated to the compressed foam using the rayon fabric by the method of Example III. The laminate was then impregnated with the heat-sensitive vinyl latex composition given in Example III. The latex was gelled by live steam and the product had a weight of 82.4 g/sq. ft.

A finish was applied as in Example III. The material was 1.6 mm thick, had a leather-like appearance and feel and a water-vapor transmission rate of 1.2 mg/sq.cm./hr.

EXAMPLE V

A sheet of compressed reticulated polyester polyurethane foam was produced as described in Example II. The sheet weighed 18 g/sq.ft. and had a thickness of 0.016 inch.

An adhesive material, in the form of a spun fleece of homogeneous fusible substance, sold under the trade name of Bondina M by Bondina M Ltd., and weighing 3.6 g/sq.ft. at a thickness of 0.010 inch, was laid on the woven rayon fabric described in Example II. The sheet of compressed foam was placed on the adhesive layer, and the combination was heated in a press under a pressure of 4 tons per sq. ft. at 140° C. for 1 minute. The press was cooled and the laminate removed.

One sq. ft. of the laminate was impregnated by the method and with the natural rubber latex of Example I. The resulting product had a water-vapor permeability of 2.0 mg/sq. cm./hr. and had the appearance and feel of a typical shoe-lining material.

EXAMPLE VI

A sheet of compressed reticulated polyester polyurethane foam was prepared as described in Example II. The sheet weighed 18 g/sq.ft. and had a thickness of 0.016 inch.

An adhesive was applied in the form of discontinuous dots to one surface of the foam sheet. The adhesive was a carboxylated styrene-butadiene latex of 53 percent solids content and a viscosity of 1,000 centipoises. The adhesive was applied in the form of hexagonally disposed dots of one-sixteenth inch diameter, with centers one-eighth inch apart. The dots protruded to an average height of one thirty-second inch above the surface of the foam.

A sheet of the woven rayon fabric described in Example III was laid against the adhesive side of the foam. The laminate was maintained under light pressure against a heated metal drum by a poly(ethylene terephthalate) mesh fabric belt and heated to 140° C for 10 minutes to dry and cure the adhesive.

One sq. ft. of the laminate was impregnated with the heat-sensitive vinyl latex formulation of Example III by the method given in Example III.

The resulting permeable product was of a construction suitable for use as a shoe-lining material.

EXAMPLE VII

A sheet of compressed reticulated polyester polyurethane foam was prepared by the method of Example II. The sheet was 0.016 inch in thickness. Another sheet of foam was prepared by splitting a non-compressed sheet of the same polyester polyurethane foam to a thickness of 2 mm.

A line of gas jets was assembled and positioned to provide uniform heating at a surface placed above them. The flames were adjusted so that their temperature was above the melting point of the foam at the position of this surface. One surface of each foam was then passed across the flames at a rate sufficient to achieve a small amount of "burn-off" of the polyurethane foam. The two tacky surfaces were then brought together and held under light pressure for several days to allow the bond to develop maximum strength.

A heat-sensitive vinyl latex mix was prepared according to the formulation of Example III. The mix was poured into a horizontal tray and the foam laminate placed on the latex with the compressed foam uppermost. The latex was seen to permeate uniformly to the top surface. At this point, the sample was removed from the tray and immediately hung in an open steam-oven for 3 minutes. The product was then removed and dried. The non-compressed foam surface was lightly buffed to remove excess latex.

A polyacrylate finish was applied to the compressed foam surface as described in Example III. The product weighed 70 g/sq.ft. and had a pleasant supple leather-like feel.

EXAMPLE VIII

A PVC plastisol was prepared from the following:

| | Parts |
|---|---|
| Poly(vinyl chloride) (Geon 121*) | 100 |
| Butyl benzyl phthalate | 45 |
| Dioctyl phthalate | 35 |
| Iso-octyl epoxystearate | 5 |
| Foamade D | 15 |

*Geon 121 is a high molecular weight homopolymer with K value 70–74. Foamade D is a metal soap foaming aid and stabilizer manufactured by the Vanderbilt Co. Inc.

The plasticizers were mixed and 60 percent of their total weight was added to the PVC resin with stirring to form a stiff paste. The paste was then passed through a triple roll mill and the remaining 40 percent of the total weight of the plasticizers was then added and the whole mix stirred until completely homogeneous.

The plastisol and Foamade D were whisked in a Hobart Mixer at speed setting No. 2 for 15 minutes at room temperature. The resulting foamed plastisol was spread onto the fabric described in Example I, gelled and fused at 175° C. for 15 – 20 minutes to give a foam layer of thickness 0.11 inch with a density of 0.26 g./cc.

The foam/fabric laminate which was permeable to air was compressed between spacing strips at 140° C. for 10 – 15 minutes to give a final foam thickness of 0.034 inch and a density of 0.997 g./cc.

A split non-woven textile web was produced as in Example III, and the polypropylene surface was laminated to the cotton side of the foam/fabric laminate by the process described in Example VI.

The composite product was impregnated with PVC by the process described in Example III.

EXAMPLE IX

A polyethylene foam, 0.19 inch thick, having a substantially closed-cell structure and a density of 0.033 g/cc. was spiked by passage through a needle-punching machine fitted with 41 gauge needles without barbs, receiving 32 punches/sq. inch. The foam was then subjected to reticulation by packing it into an explosion chamber so that no voids were present within the chamber except those within the cellular material itself, substantially evacuating the chamber of air, filling the chamber with an explosive gaseous medium and effecting ignition of the medium. The resulting foam was partially reticulated.

A structure was built-up by superimposing a 0.002 inch thick film of a copolymer of ethylene and vinyl acetate containing 18 percent by weight of the latter, melt index 1.4 according to ASTM D.1238-65T, onto the split non-woven web described in Example III and covering the film with a layer of the polyethylene foam.

The laminate was then formed by compressing the structure in a spaced mold in a platen press fitted with 0.080 inch spacers for 10 minutes at 100° C., under a pressure of 1,000 lb/sq. in. followed by cooling before releasing the pressure.

The laminate was impregnated with the PVC latex system described in Example III with the polyethylene foam uppermost. The contact time with the latex was 20 seconds, there being no penetration to the top surface.

EXAMPLE X

A polyurethane foam was prepared from a mixture of 100 parts of castor oil, 0.35 part of stannous octoate, 5.0 parts of a blowing agent obtainable commercially as Freon 11, 56.5 parts of commercial tolylene diisocyanate, 2.0 parts of toluene, 0.2 part of triethylene diamine, 1 part of silicone (L.520 made by Union Carbide Corp.) and 3 parts of water. The resulting foam was reticular in character, having practically no cell walls, and had a density of 1.65 lb./cu.ft. and an average pore count of 30–40 pores/linear inch. One sq. ft. of this foam, 7 mm. thick, was compressed to 0.018 inch at 180° C. for 5 minutes in a spaced mold under a pressure of 470 lb./sq.in.

The compressed foam was laminated to one face of a woven nylon fabric made from 60 denier continuous filament nylon yarn (20 filaments), having 104 ends/inch
90 picks/inch
7½ turns/inch
1.6 oz. weight/sq. yard and the split non-woven textile web described in Example III was laminated to the other face of the fabric by means of the adhesive and the method described in Example III.

The laminate was impregnated with the blend of vinyl latex and butadiene/acrylonitrile latex described in Example III.

The resulting product was spray-coated and embossed as described in Example I. The finished product had the feel and appearance of a typical shoe-upper material.

EXAMPLE XI

A polyether polyurethane foam containing 20 parts of short staple nylon fiber (flock) distributed within it was made by allowing the foam-forming ingredients to react in the presence of the fibers. The resulting foam had an average pore count of 45 pores/linear inch and a density of 1.8 lb./cu. ft. The foam was split to provide a 6 mm thick sheet which was then reticulated by packing it into an explosion chamber so that no voids were present within the chamber except those within the cellular material itself, substantially evacuating the chamber of air, filling the chamber with an explosive gaseous medium and igniting the medium.

The reticulated flock-filled foam was compressed to 0.016 inch in a spaced mold for 5 mins. at 180° C. under a pressure of 470 lb/sq. in.

A reticulated polyether polyurethane foam of density 1.5 lb/cu.ft. and thickness 1 cm. was compressed to 1 mm under the same conditions.

The compressed foams were laminated one to each side of a woven fabric of the following specification:

| Material: | Continuous nylon filament | |
|---|---|---|
| | Yarn denier (warp and weft): | 60 (20 filaments) |
| | Turns/inch: | 7½ |
| | Ends/inch: | 104 |
| | Picks/inch: | 90 | by the method and with the adhesive of Example III. The composite laminate was impregnated from the non-fiber-filled foam side with the natural rubber mix and the process described in Example I.

The fiber-filled foam side was finished with the following acrylic spray formulation and embossed as described in Example I.

| | Parts |
|---|---|
| Primal HA4[1] polyacrylate | 1 |
| Butakon ML590[2] butadiene/methyl methacrylate | 1 |
| Primal Black[1] pigment | 2 |
| Water | 2 |

1. Trade name of Lennig Chemicals Ltd.
2. Trade name of I.C.I. Ltd.

The product had the appearance of a typical shoe-upper material and was 1.5 mm thick.

EXAMPLE XII

A polyester polyurethane foam of density 1.5 lb./cu.ft. was reticulated by treatment with 10 percent w/w sodium hydroxide solution for 10 minutes at 60° C., and was then washed with running water for 30 minutes and dried. The reticulated foam so produced had a density of 1.25 lb./cu.ft.

A sheet of this foam, 1 cm. thick, was compressed in a spaced mold under a pressure of 470 lb./sq. in. for 5 minutes at 180° C. to 0.016 inch.

A sheet of this foam, 1.5 cm. thick, was compressed under similar conditions to 0.040 inch.

The two foams were laminated to the nylon fabric of Example XI by the method and using the adhesive of Example II and the laminate was; impregnated with the natural rubber binder (0.016 inch foam uppermost) as described in Example I. The laminate was finished as described in Example XI.

The product was 1.5 mm thick, leather-like in appearance and had a water-vapor transmission rate of 1.0 mg./sq.cm./hr.

EXAMPLE XIII

A natural rubber foam-forming mixture was made according to the following formulation:

| | Parts |
|---|---|
| Natural rubber latex (60% solids) | 167 |
| Aqueous Sulphur (50% solids) | 5.2 |
| Aqueous potassium oleate (15% solids) | 6.7 |
| Aqueous Agerite White (50% solids) | 0.7 |
| Aqueous mercaptobenzthiazole (50% solids) | 0.8 |
| Aqueous zinc diethyl dithiocarbamate (50% solids) | 1.6 |

Above mix was compounded and allowed to stand for 16 hours at 25°C.
The following ingredients were added before foaming:

| | |
|---|---|
| Aqueous ZnO (50% solids) | 6.0 |
| Vulcafor EFE | 0.5 |
| Aqueous sodium silicofluoride (50% solids) | 3.0 |

The mixture was spread to 0.080 inch, allowed to gell, pressed by mangling to a thickness of 0.016 inch and cured for 30 minutes in steam at 100° C. The dried foam weighed 18 g/sq.ft.

A synthetic fiber felt was made and split as described in Example III.

The polypropylene side of the split felt and the compressed foam layer were laminated to the woven fabric of Example XI using the process and adhesive of Example III.

The felt was impregnated by the process of Example I, in this case there being no permeation to the top surface, by flotation on the latex bath for 20 seconds prior to gelation and cure.

The product was finished by the acrylic spray of Example XI.

EXAMPLE XIV

A sheet of reticulated polyester polyurethane foam, as described in Example I, weighing 17.5 g., was sprayed on both sides with the polyurethane composition made to the following formulation:

| | Parts |
|---|---|
| Adiprene L100 (commercial polytetramethylene ether glycol/tolylene diisocyanate prepolymer) | 100 |
| Trimethylol propane | 2 |
| 1:4-Butane diol | 2 |
| Stannous octoate | 0.5 |
| Methyl ethyl ketone | 400 |

A piece of the woven nylon fabric described in Example XI was placed on one side of the foam and the combination compressed in a spaced mold at 90° C. for 10 mins. to 0.025 inch to dry and cure the adhesive. The pick-up of adhesive was 5.4 g.

The composite product was impregnated by the process and latex of Example I.

The product was finished by the spray-process described in Example XI.

The product had the feel and drape of a typical upholstery fabric and had a permeability to water vapor of 0.9 mg/sq.cm./hr.

EXAMPLE XV

A sheet of reticulated polyester polyurethane foam having an average pore count of 55 pores/linear inch, measuring 12 inch × 12 inch × 8 mm and weighing 17.4 g was impregnated by a spray technique from each side with a natural rubber latex diluted with water to a solids content of 30 percent w/w and the sheet was dried out at 100° C. for 1 hour. The pick-up of adhesive was 7.0 g.

The impregnated sheet was then compressed at 50° C. in a spaced mold under a pressure of 470 lb/sq.in. to 0.5 mm.

A similar sheet of reticulated foam was compressed to 1.0 mm under heat and pressure as described in Example I.

One surface of each foam layer was spray-coated with the natural rubber contact adhesive DS 320, (supplied by Dunlop Products Ltd.) the pick up of adhesive was 2 g dry weight/sq.ft.

The adhesive coated layers were dried and then contacted and held under a pressure of 40 lb/sq. in. for 5 minutes at room temperature.

The laminate was impregnated with the natural rubber mix and by the process of Example I, except that after gelling the latex at 60° C., for 1 minute, the impregnated laminate was transferred to a mold fitted with spacers (1.5 mm) and held under compression at 40 lb/sq.in. for 10 minutes to cure the impregnant.

The product was dried and finished as described in Example II. It had the feel and handle of a typical shoe-upper material and was 1.5 mm thick.

EXAMPLE XVI

A sheet of reticulated polyester polyurethane foam having a density of 1.6 lb/cu.ft., 50 – 60 pores/linear inch and thickness of 8 mm was assembled with the nylon staple side of a split synthetic fiber web made as in Example III except that the polypropylene staple fiber layer was replaced by a 3 denier 1½ inch high crimp nylon staple fiber layer. The assembly was laminated by needle-punching from the fiber side. The depth of penetration of the 41 gauge needles was one-fourth inch at a needle-punch density of 2,000 punches/sq.in. The laminated assembly was compressed at 180° C. for 5 minutes in a platen press fitted with spacers to give a final thickness of 1.6 mm.

The compressed laminate was impregnated from the fiber side with the natural rubber mix as described in Example I and the foam side was finished with a spray finish as described in Example I.

What is claimed is:

1. Method for the manufacture of flexible sheet material which comprises floating the assembly of a compressed outer sheet of a cellular material adhered to a fibrous material or cellular material on a liquid binder composition with the compressed sheet being uppermost in the assembly, so that the binder permeates upwardly and impregnates the assembly, and heating the impregnated assembly to set the binder.

2. Method for the manufacture of flexible sheet material which comprises floating the assembly of a compressed outer sheet of a cellular material adhered to a fibrous material or cellular material on a liquid binder composition with the compressed sheet being uppermost in the assembly, so that the binder permeates upwardly and impregnates the assembly, and differentially heating one surface of the assembly with respect to the other surface to achieve differential distribution of the binder and to set the binder.

3. Method according to claim 2 in which the binder is a polymeric composition.

4. Method according to claim 2 in which the form in which the binder is applied is selected from the group consisting of solutions, dispersons and emulsions and the binder is set by drying.

5. Method according to claim 2 in which the binder is set by curing.

6. Method according to claim 2 in which the fibrous material is a non-woven felt.

7. Method according to claim 2 in which the cellular material is a reticulated foam.

8. Method according to claim 2 in which the cellular material is a polyurethane foam.

9. Method according to claim 2 in which the compressed sheet is maintained in the compressed condition without the aid of an adhesive.

10. Method according to claim 2 in which the compressed sheet is maintained in the compressed condition by means of an adhesive.

11. Method according to claim 2 in which the compression of the compressed sheet of cellular material is up to 20:1.

12. Method according to claim 2 in which the density of the compressed sheet if from 0.02 to 0.85 g/cc.

13. Method according to claim 2 in which the cellular material comprises fibers distributed within it.

* * * * *